United States Patent [19]

Thangathirupathy

[11] 4,399,964

[45] Aug. 23, 1983

[54] SAFETY DEVICE FOR USE IN AIRCRAFT AND AN AIRCRAFT PROVIDED WITH SUCH SAFETY DEVICE

[76] Inventor: Vellaiappan V. Thangathirupathy, No. 13, Sadasiva Pillai La., Chintadripet, Madras 600 002, Tamil Nady, India

[21] Appl. No.: 229,115

[22] Filed: Jan. 28, 1981

[51] Int. Cl.³ .............................................. B64D 45/04
[52] U.S. Cl. ................................. 244/113; 244/110 R
[58] Field of Search .................... 244/113, 110 R, 139, 244/144, 213, 110 B

[56] References Cited

U.S. PATENT DOCUMENTS

| 2,444,291 | 6/1948 | Gray | 244/113 |
| 3,129,913 | 4/1964 | Smith | 244/139 |
| 3,371,888 | 3/1968 | Alvarez-Calderon | 244/213 |
| 3,395,881 | 8/1968 | Markham et al. | 244/139 |

*Primary Examiner*—Trygve M. Blix
*Assistant Examiner*—Ivy M. Shum

[57] ABSTRACT

The common problems of nose diving and rolling over of airborne craft are sought to be overcome according to this invention by providing a safety device consisting of collapsible cover atop the fuselage, the cover being adapted to be opened or closed by the pilot of the craft.

11 Claims, 2 Drawing Figures

SAFETY DEVICE FOR USE IN AIRCRAFT AND AN AIRCRAFT PROVIDED WITH SUCH SAFETY DEVICE

BACKGROUND OF THE INVENTION

The present invention relates to a safety device for aircraft.

The reason for a number of accidents that occurred in the history of aviation can be traced back to the phenomenon commonly known as nose diving and rolling over of the craft.

This invention aims at providing increased stability to the aircraft in order to avoid such accidents that result in heavy casualties.

Another object of this invention is to provide a safety device which would not only provide increased stability to the aircraft, but could also be adapted to the aircraft in use without interfering with their existing structures or designs.

The safety device of the invention, apart from ensuring safer flying, also lowers the fuel consumption of the craft to a certain extent.

SUMMARY OF THE INVENTION

This invention thus contemplates a safety device for use in aircraft comprising a collapsible cover means disposed atop the fuselage between the wings and the cockpit, and a means accessible to the pilot to open or close said cover means.

The cover means mentioned above is an elongated plate having a curved cross-section, the curvature of which is corresponding to that of the fuselage of the craft thereby ensuring that in the collapsed position, the profile of the cover means conforms to the contour of the fuselage.

According to an embodiment of the invention, each of the two sides of the cover means at its rear end is pivotally mounted on a first sleeve member disposed around the fuselage belly.

The cover means is opened or closed by actuating a further means accessible from within the cockpit.

The said further means can be of any conventional nature. The inventor envisages, for this purpose a coupling element connected at one end to said cover means while the other end thereof is capable of being wound over a link member rotatably mounted on a second sleeve member located near the cockpit and disposed around the fuselage belly, said link member being actuated by a conventional arrangement, even by a simple mechanism such as ratchet and pawl arrangement located inside the cockpit.

Both said first and second sleeve members may be comprised of a plurality of flexible metallic sheets. Said link member may comprise of a shaft or a shaft provided with a pulley, or similar arrangement.

As stated before, the device of the invention is capable of successfully preventing nose diving of aircraft and the principle underlying operation of the device is that when the said cover means is opened, and as the craft moves at a very high speed, the air resistance created by the opened cover tends to lift up the front part of the fuselage thereby preventing nose diving. The cover may therefore be kept fully open during landing or taking off of the aircraft, but should be kept in a near-collapsed position when the craft is airborne. Since the slight opening of the cover helps in lifting up the front portion of the aircraft, the normal fuel consumption required to attain higher altitude would consequently be lowered.

DESCRIPTION OF AN EMBODIMENT OF THE INVENTION

Figure 1:
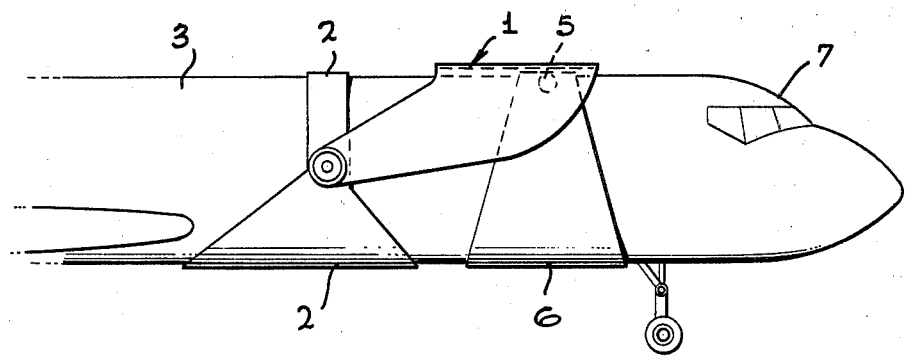
FIG. 1 shows the side view of the front portion of an aircraft fuselage provided with the device according to this invention.

Referring to the drawings, the cover means 1 of the device is pivotally mounted on the sleeve member 2 on two sides of the fuselage 3; the sleeve member 2 being disposed around the fuselage belly. The cover 1 should not be mounted on the fuselage itself since such mounting might lead to weakening the structural strength of the aircraft. For opening or closing the cover 1, linking means are provided. These linking means are comprised of a coupling element 4 and a winding roller 5. The coupling element 4 includes a haulage chain or like connected at its one end to cover 1 and at its other end to winding roller 5 about which it may be wound winding roller 5 is rotatably mounted on a second sleeve member 6 also disposed around the fuselage belly but located nearer to the cockpit 7. The winding roller 5 is capable of being actuated from the pilot's cabin through a conventional arrangement (not shown).

Figure 2:
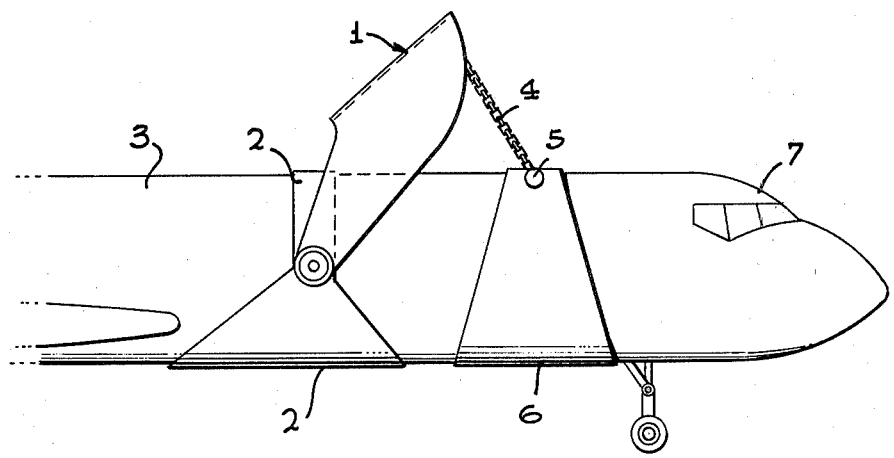
FIG. 2 shows an identical view as in FIG. 1, except that the cover means of the device is in the opened position.

In operation, when the aircraft takes off or lands, the cover 1 is kept fully open as shown in FIG. 2 so that the onrushing air from the front strikes the inner surface of the cover causing the front portion of the fuselage to be raised.

I claim:

1. A safety device for use with an aircraft, said safety device comprising: a cover which rests apart from and above said aircraft; at least one sleeve member which surrounds the fuselage belly of said aircraft, said cover being movably attached to said at least one sleeve member; and a linking means attached to said at least one sleeve member and operable to move said cover from a first position lying upon the outside surface of the aircraft fuselage to a second position extending forwardly from its attachment to said at least one sleeve member and upwardly from said fuselage.

2. A safety device as claimed in claim 1 wherein said cover corresponds in shape to the curvature of said aircraft and rests in front of the forward edges of the wings of said aircraft and behind the cockpit of said aircraft.

3. A safety device as claimed in claim 1, wherein said cover means is opened or collapsed by a coupling element attached thereto, the other end of said coupling element is capable of being wound over a link member rotatably mounted on a second sleeve member disposed around the fuselage belly, said link member being adapted to be actuated from pilot's cabin by means of a conventional arrangement.

4. A safety device as claimed in claim 3 wherein said linking means is comprised of a shaft with a pulley and a chain.

5. A safety device as claimed in claim 1 wherein said sleeve member consists of a plurality of flexible sheets attached together.

6. A safety device as claimed in claim 3, wherein said link member is a shaft.

7. An aircraft as claimed in claim 1, wherein said cover is pivotally mounted on a first sleeve member disposed around the fuselage belly, said cover being an elongated metallic plate having a curved cross-section the curvature of which is corresponding to that of the fuselage of the craft and being opened or closed by a coupling element attached thereto, the other end of said coupling element is capable of being wound over a link member rotatably mounted on a second sleeve member also disposed around the fuselage belly, the link member, in turn, is adapted to be actuated from the pilot's cabin.

8. A safety device for use in an aircraft, said safety device comprising: a cover; a first sleeve member; a second sleeve member; said cover being disposed atop the fuselage and between the wings and cockpit of said aircraft and being pivotally mounted on said first sleeve member, said first sleeve member being disposed around said fuselage body, said second sleeve member being disposed around the belly of said fuselage and between said first sleeve member and said cockpit; a coupling element, coupling said cover to said second sleeve member; and a winding roller pivotally attached to said second sleeve member for engagement with said coupling element to control the relative position of said cover with respect to said second sleeve member.

9. A safety device as claimed in claim 8, wherein said winding roller is a shaft provided with a pulley.

10. An aircraft provided with a safety device comprising: a cover; a first sleeve member which surrounds the belly of the fuselage of the aircraft and pivotally connects to said cover, a second sleeve member which surrounds the belly of the aircraft fuselage; a coupling means connected to said cover; and a linking means connected to said coupling means and to said second sleeve; said cover being comprised of an elongated and curved metallic plate corresponding in shape to that of the aircraft fuselage and lying atop of said fuselage between the wings and cockpit of the aircraft, said cover being movable between open and collapsed positions.

11. A safety device for use with an aircraft comprising: a cover; at least one sleeve member disposed around the belly of the aircraft fuselage; a winding roller pivotally attached to said at least one sleeve member; and a coupling element engaging said winding roller and said cover; said cover being disposed atop said fuselage between the wings and the cockpit and movable to open and collapsed positions by actuation of said winding roller.

* * * * *